UNITED STATES PATENT OFFICE.

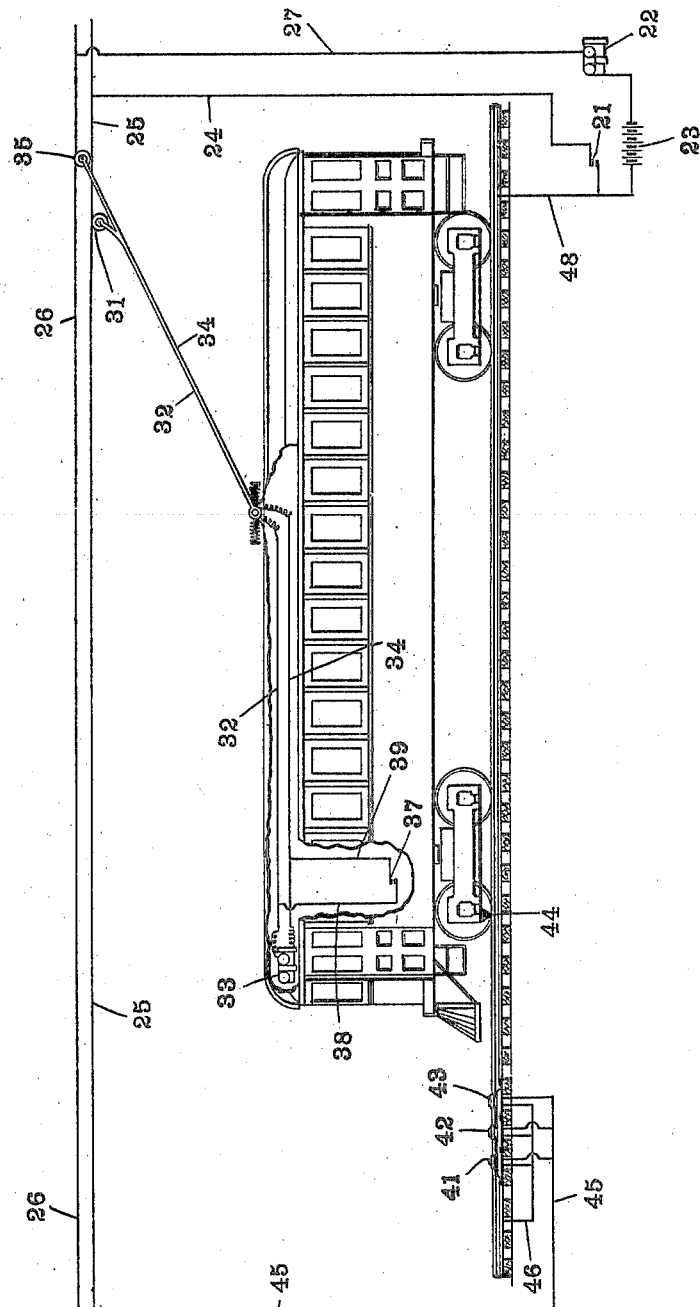

ELMER E. STEINER, OF KNIGHTSTOWN, INDIANA.

AUTOMATIC INTERCOMMUNICATING TRAIN-REPORTING SYSTEM.

No. 817,281.          Specification of Letters Patent.          Patented April 10, 1906.

Application filed July 14, 1905. Serial No. 269,686.

*To all whom it may concern:*

Be it known that I, ELMER E. STEINER, a citizen of the United States, residing at Knightstown, in the county of Henry and State of Indiana, have invented certain new and useful Improvements in Automatic Intercommunicating Train-Reporting Systems, of which the following is a specification.

In my companion application, Serial No. 269,058, filed July 10, 1905, I have described an automatic train-reporting system by means of which the number and direction of a railway-train and the number of the station will be automatically and instantaneously reported to a central office each time such train passes such station.

It being my general purpose to avoid all the delays incident to the reporting of train movements and the transmission of orders to such trains, it is the principal object of my present invention to provide a means by which the orders can be communicated to the train when in motion, so that by the use of the two inventions no stopping of trains is required for purposes of communication, so that such trains may be kept continuously in motion except where stops are required for other purposes.

A further object of my present invention is to provide a means of intercommunication between all trains moving on the same railway, and thus make it possible for the engineer, motorman, or conductor to know where all other trains on the road are, and thus take such precautionary measures as may be proper where two or more trains are in proximity to each other.

The accompanying drawing illustrates a system or apparatus embodying my present invention. Said drawing is a view illustrating diagrammatically an electrical apparatus or system embodying my said invention. I have included in this figure an illustration of a car of the type commonly used in interurban electric service; but it will be understood that this is for purposes of illustration merely, and that the invention is quite as applicable to steam-railways having locomotives and cars of the ordinary type, and that the electrical equipment indicated is not necessarily of any significance, except for the purposes of my present invention.

In a central station or train-despatcher's office I provide a transmitting instrument 21, which is or may be an ordinary telegraph-key, a suitable receiving instrument 22, and usually a battery 23. The transmitting instrument is connected by a suitable wire 24 to a trolley-wire 25, and a second trolley-wire 26 is connected to the receiving instrument by a suitable wire 27.

The car is equipped with a double trolley. The trolley-wheel 31, which is in contact with the trolley-wire 25, is connected, by means of a wire 32, running down the trolley-pole and thence into the car, with a receiving instrument 33 in said car, and from said instrument another wire 34 leads back up to the trolley-wheel 35, which is in contact with the trolley-wire 26. Now it is obvious that a signal transmitted from the key 21 will pass up the wire 24, along the wire 25 to the trolley 31, thence down the wire 32 to the receiving instrument 33, thence by the wire 34 back to the trolley 35, thence by the trolley-wire 26 to the branch 27, and thence to the receiving instrument 22 in the central station or train-despatcher's office. Connections between the receiving and transmitting instruments, preferably through the battery 23, complete the circuit, as will be readily understood.

The trolley-wires 25 and 26 continue along the line. Each of the cars is equipped with a similar apparatus. It is obvious, therefore, that the same signal is transmitted to each of the cars, so that the operator on each car will hear all the orders which are being transmitted to all the cars or trains on the road. Each car may also be provided with a transmitting instrument 37, suitably connected to the circuit, as by the wires 38 and 39, and the person in charge of the car is thus enabled to transmit signals (communicating information or acknowledging receipt of orders) back to the central station or train-despatcher's office. These signals will likewise be overheard and understood by the operative upon each car or train on the road whose duty it is to attend to the receiving and transmitting of these signals.

As before stated, it is my purpose to use this invention in conjunction with the automatic train-reporting system described in my application, Serial No. 269,058, above mentioned, and a form of said automatic train-reporting apparatus is shown in said drawing. The push-buttons 41, 42, and 43 of said system are shown as located alongside the track, ready to be operated by the strike 44, carried by the train, and one member of said push-buttons is connected to the trolley-wire 25 by a wire 45 and the other member to one of the track-rails by a wire 46. Said track-rail is connected to the key or receiving instrument by a wire 48, and the circuit is thus completed. In this arrangement, therefore, all the signals which are automatically transmitted by the passage of the train, as more fully described in my said application, Serial No. 269,058, are also transmitted to all the several cars or trains on the road, and that operative on each train whose duty it is to observe or attend to such signals is thus kept constantly informed of the location and movement of all of the other trains.

Having thus fully described my said invention, what I claim as new, and desire to secure by Letters Patent, is—

1. In an automatic intercommunicating train-reporting system, two trolley-wires running along the line, an instrument on each train to be communicated with, connections from said wires to an instrument on each of said trains, a signaling apparatus adapted to be operated automatically by each train as it passes, a central station, and circuits connecting said several sets of apparatus, whereby all signals given from whatever point shall be communicated to each other train and point equipped with such apparatus.

2. In an automatic intercommunicating train-reporting system, an electrical circuit including two trolley-wires, a central station having a transmitting and a receiving instrument, connections from said instruments to said trolley-wires, a car having a receiving instrument, connections from said instrument to said trolley-wires, a station-signaling apparatus located alongside the track, an electrical circuit including one of said trolley-wires leading to said signaling apparatus, and means carried by the car whereby said signaling apparatus is operated as the car passes, whereby a complete system of communication is established between the central office and the cars, and whereby the passage of each car thus equipped is automatically reported from the station-signaling apparatus both to the central station and to each other similarly equipped car on the line.

In witness whereof I have hereunto set my hand and seal, at Indianapolis, Indiana, this 11th day of July, A. D. 1905.

ELMER E. STEINER. [L. S.]

Witnesses:
CHESTER BRADFORD,
JAMES A. WALSH.